United States Patent

[11] 3,542,306

| [72] | Inventor | John J. Bundschuh |
| | | Rochester, New York |
| [21] | Appl. No. | 789,564 |
| [22] | Filed | Jan. 7, 1969 |
| [45] | Patented | Nov. 24, 1970 |
| [73] | Assignee | Eastman Kodak Company |
| | | Rochester, New York |
| | | a corporation of New Jersey |

[54] CARTRIDGE FOR ROLL OF WEB MATERIAL
8 Claims, 6 Drawing Figs.

| [52] | U.S. Cl. | 242/71.1 |
| [51] | Int. Cl. | G03b 1/04 |
| [50] | Field of Search | 242/197, 71.1 |

[56] References Cited
UNITED STATES PATENTS

| 3,250,482 | 5/1966 | Whitnah | 242/197 |
| 3,394,901 | 7/1968 | Bunting | 242/71.1 |

*Primary Examiner*—Nathan L. Mintz
*Attorneys*—Robert W. Hampton and J. Addison Mathews ABSTRACT: A cartridge adapted to rotatably contain a reel of web material includes means cooperative with the reel to prevent rotation of the reel when the reel is improperly oriented in the cartridge. In a preferred embodiment the reel includes an abutment member or pin extending axially therefrom adjacent a hub portion of the reel and the cartridge includes an arcuate slot subtending an angle of less than 360° in a sidewall of the cartridge. The slot in the cartridge is adapted to receive the pin to prevent rotation of the reel in the cartridge when the reel is improperly oriented in the cartridge.

Patented Nov. 24, 1970

3,542,306

JOHN J. BUNDSCHUH
INVENTOR.

BY *J. Alding Mathews*

*Robert W. Hampton*
ATTORNEYS

CARTRIDGE FOR ROLL OF WEB MATERIAL

CROSS REFERENCE TO RELATED APPLICATION

Reference is made to commonly assigned copending U.S. Pat. application Ser. No. 685,597, entitled CARTRIDGE AND REEL ALINEMENT MEANS, filed in the name of Arthur H. Crapsey on Nov. 24, 1967, now U.S. Pat. No. 3,491,965.

BACKGROUND OF THE INVENTION

The present invention relates to cartridges for rolls of elongated web material and more particularly to cartridges having means for preventing rotation of a web supporting reel in the cartridge when the reel is not properly oriented in the cartridge.

In the motion picture field, projector systems have been developed wherein film to be projected is contained on a reel in a cartridge, and a mechanism automatically removes the film from the cartridge for projection and rewinds it into the cartridge when projection is completed. Such a projector system is disclosed, for example, in commonly assigned copending U.S. application Ser. No. 685,616 entitled CINEMATOGRAPHIC PROJECTORS OR THE LIKE AND CARTRIDGES FOR USE THEREWITH, filed in the name of J. J. Bundschuh et al. on Nov. 24, 1967. In projector systems of this type it is important that the cartridge be properly oriented in the projector for receiving the film removing mechanism, and, to this end, the cartridge may be provided with alining and latching surfaces which assure such proper orientation. Cartridge alining surfaces are disclosed for example, in commonly assigned copending U.S. application Ser. No. 736,524 entitled CARTRIDGE, filed in the name of J. J. Bundschuh on May 23, 1968, now abandoned.

In addition to orientation of the cartridge on the projector, it is also desirable in such systems to provide means for assuring proper orientation of the reel within the cartridge, such that the perforated edge of the film will be alined for engagement with the film advancing mechanism of the projector. One method for assuring proper orientation of a reel in the cartridge is disclosed in commonly assigned copending U.S. Pat. application Ser. No. 685,597 entitled CARTRIDGE AND REEL ALINEMENT MEANS filed in the name of Arthur H. Crapsey on Nov. 24, 1967, now U.S. Pat. No. 3,491,965. The reel orienting means disclosed in this Crapsey application makes use of the fact that automatic projector systems of the above type often include mechanisms in which the trailing end portion of the film is secured to the hub of the reel by a film retaining device. This device increases film tension and thereby actuates the rewind cycle when the projector feed mechanism attempts to pull the film end from the reel. An automatic rewind mechanism of this type is disclosed, for example, in commonly assigned U.S. Pat. No. 3,300,155 entitled AUTOMATIC REWIND MECHANISM FOR FILM OR THE LIKE and issued in the name of Robert J. Roman on Jan. 24, 1967. The film retaining device comprises a socket molded as a part of the hub of the reel and into which the film end portion may be received. The film end portion is then releasably secured in the socket by a retaining pin which is inserted into the socket to bend and frictionally engage the film between the pin and socket. In order to prevent improper orientation of film in the cartridge, the end of the film retaining pin is extended outwardly beyond the reel periphery and the cartridge is provided with openings in the sidewalls thereof which cooperate with the pin to permit or prevent insertion of the reel in the cartridge depending on whether the reel is properly or improperly oriented in the cartridge, respectively. One of said openings has a radius which is greater than the distance between the pin and the axis of rotation of the reel to thereby permit insertion of the reel into the cartridge when the reel is properly oriented in the cartridge. The other opening, on the other hand, in the other sidewall of the cartridge, has a smaller radius such that the sidewall will interfere with the pin and prevent insertion of the reel into the cartridge when the reel is not properly oriented in the cartridge.

While the above means for assuring proper orientation of the reel in the cartridge has been generally satisfactory, it may still be possible to force the reel into the cartridge in an improper position of orientation. Such forced insertion is possible because the sidewalls of the cartridge generally are formed from plastic material and may be distorted or flexed outwardly to accept the pin even though the reel is not properly oriented in the cartridge. In this event the mechanism for automatically removing the film from the cartridge may force the reel to rotate in the cartridge with the pin jammed against the distorted wall of the cartridge and the film may be removed from the cartridge with the imperforate edge alined with the film advancing mechanism of the projector, resulting in damage to the film and possibly also the projector.

SUMMARY OF THE INVENTION

It is an object of the present invention to provide an improved cartridge for a roll of elongate web material, which will prevent rotation of the roll in the cartridge when the roll is not properly oriented in the cartridge.

In accordance with one embodiment of the invention a cartridge adapted to receive a film reel having abutment means extending outwardly from the reel periphery is provided with means cooperative with the abutment means on the reel to prevent rotation of the reel in the cartridge when the reel is not properly oriented in the cartridge. In the disclosed embodiment the cartridge includes an arcuate slot subtending an angle of less than 360° in one sidewall of the cartridge. The slot is adapted to receive the abutment means when the reel is improperly oriented in the cartridge to thereby prevent rotation of the abutment means and the reel. When the reel is properly oriented in the cartridge, an opening in the other sidewall of the cartridge permits rotation of the abutment means and the reel.

BRIEF DESCRIPTION THE DRAWING

DESCRIPTION OF THE PREFERRED EMBODIMENT

Figure 1:
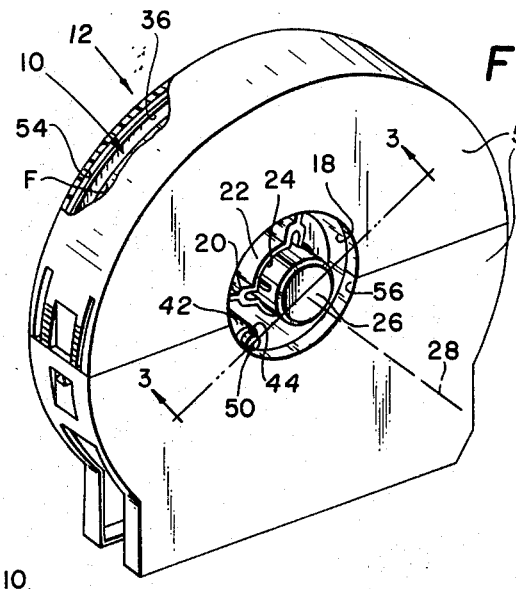
FIG. 1 is a perspective view of a cartridge in accordance with the present invention and including a web supporting reel rotatably received therein.

Referring to the drawing there is shown a film supply reel 10 adapted to be rotatably contained in a cartridge 12. The supply reel 10 comprises a generally hollow hub member 14 having an annular outer surface 16 on which film F is adapted to be wound and having an inner surface 18. From inner surface 18 a plurality of arms 20 extend radially inwardly to a core portion 22 having a suitable central opening 24 adapted to receive a spindle 26 of a motion picture projector. The annular outer surface of the hub member and the central opening define a longitudinal axis of rotation 28 about which the reel is adapted to rotate in the cartridge and in the projector. Moreover, the hub member defines first and second sides 30 and 32 of the reel, respectively, from which a pair of axially spaced parallel side flanges 34 and 36 extend radially outwardly to guide successive convolutions of film onto the hub member and to protect film on the hub member. Side flange 34 is provided with a brake 38 therein in alinement with a film alining slot 40 in the hub 30 such that the end portion of a film or web can be threaded into the slot.

In the disclosed embodiment a socket which takes the form of a sleeve 42, having an axial slot 44, is attached to the reel on inner surface 18 by molding or other suitable means. The sleeve is located on inner surface 18 such that slot 44 separates the sleeve into two semicircular halves circumferentially alined on opposite sides of the film threading slot 40.

Figure 2:
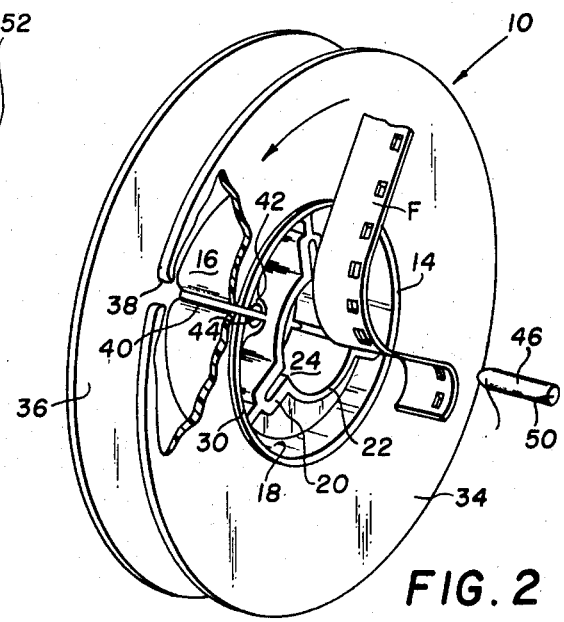
FIG. 2 is a perspective view of a reel adapted to be contained in the cartridge depicted in FIG. 1 and showing the retaining means for securing the end of the film to the hub of the reel.

A retaining pin 46 is adapted to be slidably received in sleeve 42 and cooperates therewith to bend and frictionally retain the end portion of the film to the hub 30. More specifically the pin 46 may comprise an elongated rigid body portion 48 and an abutment means or member illustrated as head portion 50. The body portion 48 has a diameter cooperative with the diameter of the sleeve to secure the end portion of film or web material in the socket and to frictionally retained within socket 42 when film is received therein. In operation the end of the film is inserted into film threading slot 42 and between the two semicircular halves of retaining sleeve 42, as shown in FIG. 2. Elongated body portion 48 of the pin 46 is then slidably inserted into retaining sleeve 42 such that the film is resiliently deformed and held between the pin and wall of one semicircular half of sleeve 42 to thereby retain the film to the reel hub as shown in FIG. 2.

Figure 3:
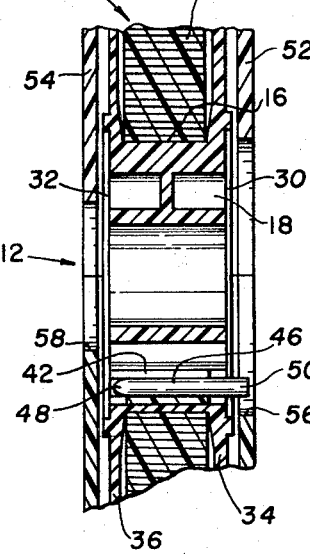
FIG. 3 is a fragmentary sectional view of the reel and cartridge illustrating the extended end portion of the film retaining means received in the opening of larger radius in one sidewall of the cartridge and also illustrating the opening of smaller radius in the other sidewall of the cartridge.

Referring now more particularly to FIGS. 1 and 3 cartridge 12 comprises a two-part casing adapted to contain the reel 10 and generally defining sidewalls 52 and 54 having central openings 56 and 58, respectively, through which spindle 26 of a projector may extend. As described in previously mentioned U.S. application Ser. No. 736,524 the cartridge 12 may be provided with indexing surfaces whereby the cartridge can only be mounted on the projector in a predetermined position of orientation.

Opening 56 of sidewall 52 has a larger diameter than the opening 58 in sidewall 54. In addition opening 56 has a radius of which exceeds the distance between the rotational axis of reel 10 and the outermost edge of head portion 50 of retaining pin 46 such that pin 46 will freely orbit within opening 56 when reel 10 is rotated by the projector spindle 26 in cartridge 12. Opening 58, on the other hand, has a smaller radius than opening 56 and also a smaller radius than the distance between the reel axis of rotation and the outermost edge of head portion 50. Thus, interference will result between the abutment means or head 50 of pin 46 and the cartridge surfaces if it is attempted to position the reel in the cartridge when the reel is improperly oriented relative to the cartridge. Ordinarily, such interference between the head portion 50 and the cartridge surfaces is sufficient to prevent improper orientation of the reel in the cartridge. However, as shown in FIG. 4 it may still be possible, due to distortion or flexing of the sidewalls of the cartridge, to force the reel into the cartridge even though the reel is not properly oriented in the cartridge.

Figure 4:
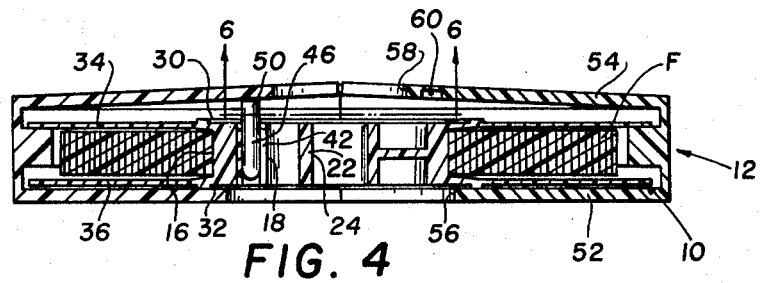
FIG. 4 is a sectional view of the cartridge and reel contained therein illustrating the reel improperly oriented in the cartridge and the manner in which the sidewalls of the cartridge may be distorted to receive the film retaining pin in such orientation.
Figure 5:
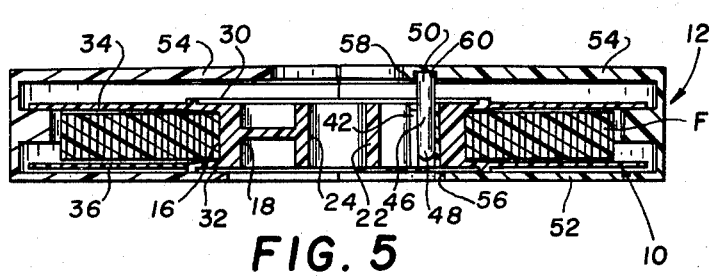
FIG. 5 is a sectional view of the reel and cartridge depicting the manner in which the film retaining pin is received in an arcuate slot in one sidewall of the cartridge when the reel is improperly oriented in the cartridge.
Figure 6:
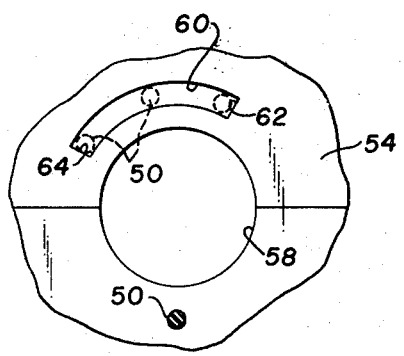
FIG. 6 is a fragmentary view of an inside surface of a side wall of the cartridge illustrating the arcuate slot depicted in FIG. 5 and the manner in which the film retaining pin is received therein to prevent rotation of the reel when the reel is improperly oriented in the cartridge.

Referring now in more particular to the details of the present invention, and to FIGS. 4—6 the cartridge sidewall 54 having the smaller opening 58 therein is provided with means cooperative with the abutment means or head portion 50 to prevent rotation of the reel in the cartridge in the event the reel is forced into the cartridge in an improper position of orientation. In the preferred embodiment this means for preventing rotation of the reel comprises an arcuate or circular slot 60 which is spaced radially outwardly from opening 58 and which is located at a radius approximately equal to the distance between the rotational axis 28 of reel 10 and the head portion 50 of pin 46. Thus, as shown on FIG. 5, slot 60 is positioned to receive head 50 of pin 46 when the reel is improperly oriented in the cartridge. Slot 60 may comprise an opening passing entirely through sidewall 54, or, as disclosed in the preferred embodiment, it may take the form of a recess in the sidewall. The slot or recess subtends an angle of less than 360° and defines at its ends abutment means or stepped portions illustrated as the leading and trailing edge portions 62 and 64, respectively, of slot 60. These end portions are adapted to cooperate with the abutment means 50 on the reel when the reel is not properly oriented in the cartridge to prevent rotation of the reel in the cartridge in either direction of rotation of the reel about its axis of rotation 28.

Should the projector be operate when the reel is in an improper position of orientation relative to the cartridge, the projector spindle 26 may force the reel to rotate a portion of a revolution. However, when abutment means or head portion 50 of pin 46 reaches the leading edge portion 62 of slot 60, the head 50 will drop into slot 60 and will continue to rotate only until the head portion 50 engages the trailing edge 64 of slot 60, at which time the further rotation of the reel in the cartridge will be prevented by such abutment between head 50 and trailing edge 64.

Thus it can be seen that the reel may be inserted into the cartridge in either of two positions of orientation, and that only one of these positions of orientation is the proper orientation for alinement between perforations in the film on the reel and the projector film advancing mechanism. In the event the reel is inserted and positioned into the cartridge in this proper orientation, larger opening 56 in sidewall 52 will cooperate with the abutment means or head portion 50 of pin 46 to permit free and continued rotation of the reel in the cartridge in response to rotation of spindle 26. On the other hand, if the reel should be inserted and positioned in the cartridge in the other or improper orientation, slot 60 in sidewall 54 will prevent rotation of the reel in the cartridge, thus preventing damage to the film or projector by misalinement between the perforated film edge and the projector film advancing mechanism. Damage to the spindle 26 is prevented through a slip drive coupling which may be of any design known to those skilled in the art and which therefore is not shown.

The preferred embodiment has been illustrated and described in connection with a cartridge having central openings 56 and 58 of different sizes which are adapted to prevent improper insertion of the reel into the cartridge as explained heretofar and as in further described in aforementioned application Ser. No. 736,524. However, it should be understood that the present invention may be incorporated into cartridges which freely permit insertion of reels in either position of orientation. In this case, the invention would operate in a similar manner to that described above to prevent rotation of the reel in the cartridge when the reel is inserted into the cartridge in an improper position of orientation.

The invention has been described in detail with particular reference to preferred embodiments thereof, but it will be understood that variations and modifications can be effected within the spirit and scope of the invention.

I claim:

1. A cartridge adapted to rotatably contain a web-supporting hub member in a predetermined position of orientation in the cartridge, the hub member defining two spaced sides and including abutment means extending outwardly beyond one of said sides, the cartridge comprising:

two spaced sidewalls for receiving the hub member therebetween; and, means defining a discontinuity in one of said sidewalls cooperative with said abutment means for preventing rotation of the hub member in the cartridge when the hub member is not oriented in the predetermined position of orientation in the cartridge.

2. A cartridge adapted to rotatably contain a hub member for supporting web material, the hub member having an axis and first and second axially spaced sides and including abutment means extending axially outwardly beyond the first of the sides, the cartridge comprising:

first and second axially spaced sidewalls for receiving the hub member therebetween, the first of said sides having means cooperative with the abutment means to permit rotation of the hub member when the hub member is oriented in the cartridge with the first side of the hub member adjacent the first wall of the cartridge; and means defining a discontinuity in the second wall of the cartridge cooperative with the abutment means to prevent rotation of the hub member when the hub member is oriented in the cartridge with the first side of the hub member adjacent the second wall of the cartridge.

3. In a web storage means including a web supporting hub defining an axis and two axially spaced sides and further including a cartridge adapted to rotatably receive the hub in a proper orientation in the cartridge, the improvement comprising:

abutment means on the hub extending axially beyond one of the sides of the hub; and discontinuity means on the cartridge cooperative with said abutment means for preventing rotation of the hub in the cartridge when the hub is not properly oriented relative to the cartridge.

4. The improvement claimed in claim 3, wherein the cartridge has two axially-spaced sidewalls for receiving the hub member therebetween and the discontinuity means on the cartridge comprises an arcuate slot in one of said sidewalls, said slot being configured to receive said abutment means to prevent rotation of said abutment means and said hub when said hub is not properly oriented relative to the cartridge.

5. In a reel and cartridge assembly wherein the reel has a web supporting hub member defining an axis and the cartridge has two axially spaced sidewalls rotatably receiving the reel therebetween in either of two orientations relative to the cartridge, the improvement comprising:

an abutment means extending axially outwardly from the hub member; and, an arcuate slot in one sidewall of the cartridge for receiving said abutment means when the reel is in one of its orientations in the cartridge, said slot subtending an angle of less than 180° for preventing continued rotation of the reel in the cartridge when the reel is in the one of its orientations.

6. A cartridge adapted to contain a reel of motion picture film, the reel being insertable in the cartridge in either of two orientations and having a periphery and an abutment member extending outwardly beyond the periphery of the reel, the cartridge comprising:

first and second sides for receiving the reel;

means in said first side defining an opening therein for receiving the member when the reel is in a first orientation in the cartridge, said means being configured to permit rotation of the reel in the cartridge in the first orientation; and second means in said second side for receiving the member when the reel is in a second orientation in the cartridge, said second means being configured to prevent rotation of the reel in the cartridge in the second orientation.

7. A cartridge as claimed in claim 6 wherein said first and second sides comprise spaced sidewalls for receiving the reel therebetween and wherein said second means comprised an arcuate slot subtending an angle of less than 360°, said slot defining at its ends abutment means cooperative with the abutment member on the reel to prevent rotation of the reel when the reel is in the second orientation in the cartridge.

8. A cartridge as claimed in claim 6 wherein the abutment member comprises a pin for releasably securing film to the reel and wherein said second means comprises an arcuate slot subtending an angle of less than 360°, said slot defining at its ends abutment means cooperative with the pin for preventing rotation of the reel when the reel is in the second orientation in the cartridge.